(12) United States Patent
Byrne et al.

(10) Patent No.: US 10,399,509 B2
(45) Date of Patent: Sep. 3, 2019

(54) VEHICLE CAMERA WITH REPLACEABLE COVER

(71) Applicant: MAGNA ELECTRONICS INC., Auburn Hills, MI (US)

(72) Inventors: Steven V. Byrne, Goodrich, MI (US); Yuesheng Lu, Farmington Hills, MI (US); James R. Hough, Linden, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 302 days.

(21) Appl. No.: 15/062,526

(22) Filed: Mar. 7, 2016

(65) Prior Publication Data

US 2016/0264064 A1    Sep. 15, 2016

Related U.S. Application Data

(60) Provisional application No. 62/132,203, filed on Mar. 12, 2015.

(51) Int. Cl.
*B60S 1/56*     (2006.01)
*H04N 7/18*    (2006.01)
*B60R 11/04*   (2006.01)
*G02B 27/00*   (2006.01)
*H04N 5/225*   (2006.01)

(52) U.S. Cl.
CPC .......... *B60R 11/04* (2013.01); *G02B 27/0006* (2013.01); *H04N 5/2251* (2013.01); *H04N 5/2257* (2013.01)

(58) Field of Classification Search
CPC ...................................................... B60R 11/04
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,949,331 | A | 9/1999 | Schofield et al. |
| 6,719,215 | B2 * | 4/2004 | Drouillard .............. B60S 1/485 239/284.1 |
| 7,965,336 | B2 * | 6/2011 | Bingle .................... B60R 11/04 348/149 |

(Continued)

FOREIGN PATENT DOCUMENTS

EP      2949521     * 12/2015     ............ B60S 1/0848

OTHER PUBLICATIONS

NPL internet Search (Year: 2019).*

*Primary Examiner* — Luis Perez-Fuentes
(74) *Attorney, Agent, or Firm* — Honigman LLP (57) ABSTRACT

A vision system of a vehicle includes a camera disposed at an exterior portion of a vehicle and having a field of view exterior of the vehicle. The camera has a camera housing and a lens. A cover element is removably disposed at the camera. The cover element includes a curved transparent portion and a mounting portion. The curved transparent portion of the cover element, when the cover element is disposed at the camera, protects the lens so that the lens is not exposed to the environment external the vehicle. The cover element may be configured to be fixedly mounted at the exterior portion of the vehicle, such that the camera is removably mounted at the vehicle by detachable attachment at the cover element.

9 Claims, 5 Drawing Sheets

(56) References Cited

U.S. PATENT DOCUMENTS

| | | | | |
|---|---|---|---|---|
| 8,567,963 B1* | 10/2013 | Criscuolo | ............... | B08B 1/006 |
| | | | | 359/507 |
| 9,327,689 B2* | 5/2016 | Kikuta | .................... | B60S 1/483 |
| 9,645,392 B2* | 5/2017 | Yoshimura | .............. | B60R 11/04 |
| 2011/0266375 A1* | 11/2011 | Ono | ...................... | B60S 1/0848 |
| | | | | 239/589 |
| 2012/0243093 A1* | 9/2012 | Tonar | .................. | H01L 41/0973 |
| | | | | 359/507 |
| 2014/0060582 A1* | 3/2014 | Hartranft | ................ | B60R 11/04 |
| | | | | 134/18 |
| 2014/0192410 A1* | 7/2014 | Yoshimura | ............. | B60R 11/04 |
| | | | | 359/509 |
| 2015/0138357 A1* | 5/2015 | Romack | ................ | H04N 7/185 |
| | | | | 348/148 |
| 2015/0321621 A1 | 11/2015 | Van Dan Elzen et al. | | |
| 2015/0344001 A1* | 12/2015 | Lopez Galera | ........... | B60S 1/56 |
| | | | | 134/198 |
| 2016/0001330 A1* | 1/2016 | Romack | ................... | B08B 3/02 |
| | | | | 134/18 |
| 2016/0264064 A1* | 9/2016 | Byrne | ..................... | B60R 11/04 |
| 2016/0272163 A1 | 9/2016 | Dreiocker et al. | | |
| 2017/0036647 A1* | 2/2017 | Zhao | ....................... | B60R 11/04 |
| 2017/0036650 A1* | 2/2017 | Hester | ................... | G02B 13/04 |

\* cited by examiner

VEHICLE CAMERA WITH REPLACEABLE COVER

CROSS REFERENCE TO RELATED APPLICATION

The present application claims the filing benefits of U.S. provisional application Ser. No. 62/132,203, filed Mar. 12, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides a cover at the camera to protect the camera and lens from direct exposure to the environment exterior the vehicle. The camera may be mounted or disposed at an exterior structure of the vehicle, such as, for example, a vehicle panel, grill, bumper, fascia, light bar, center high mounted stop lamp (CHMSL) or the like, with its lens viewing exterior of the vehicle. The cover is provided at the camera and is removably attached at the camera or vehicle structure, whereby the cover may be removed and replaced if damaged or marred, while not having to remove and replace the camera as well. The cover may comprise a transparent plastic or polymeric or polycarbonate material or may comprise a transparent glass material.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
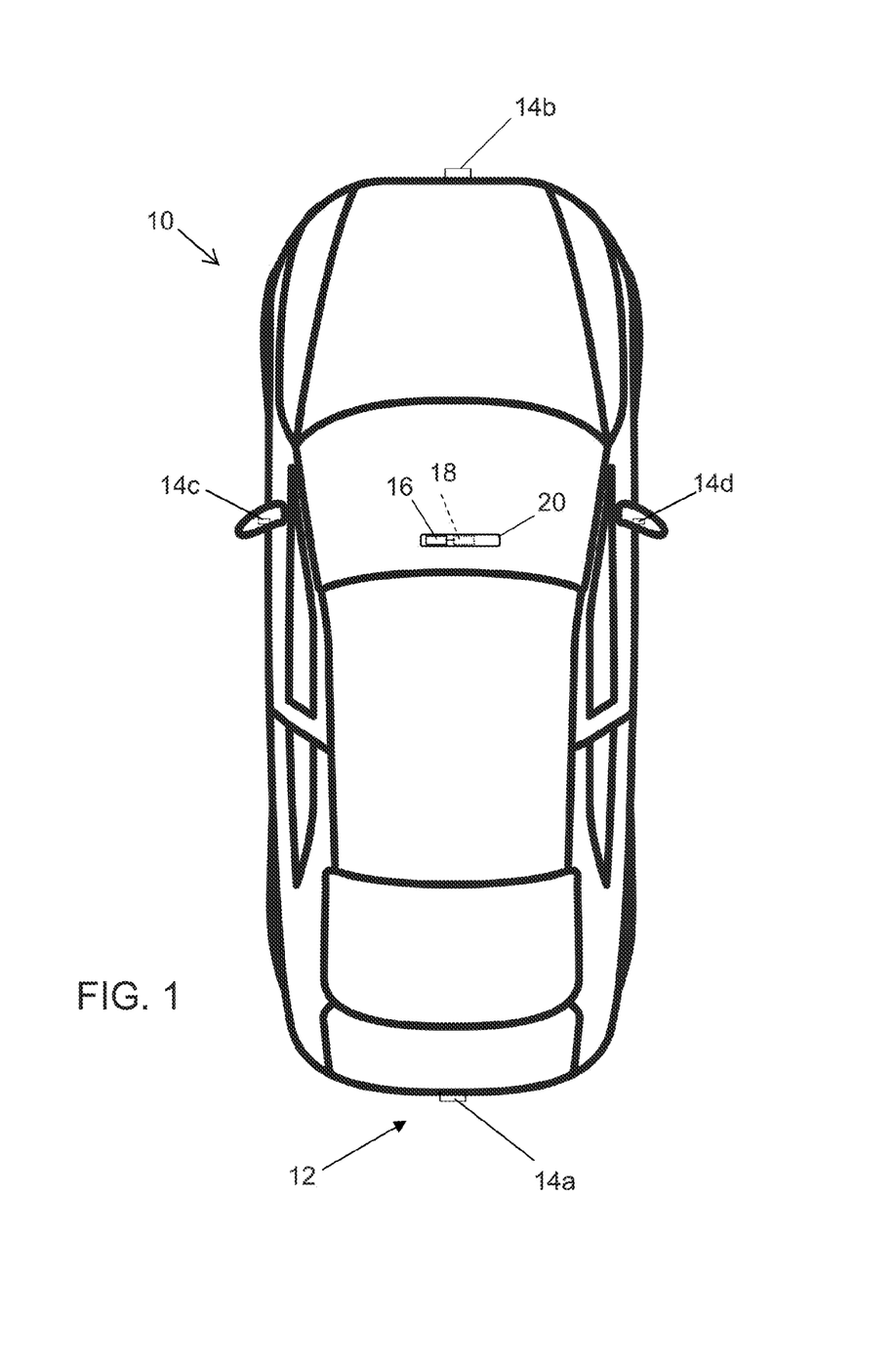
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The cameras include a housing and imager and a lens that is oriented such that the camera views exterior of the vehicle. Such automotive camera lenses are susceptible to damage. When damage occurs to the camera lens (which is typically bonded in place at the camera housing and not removable from the camera), the entire camera must be replaced by the vehicle owner which is very costly. This is particularly an issue for cameras mounted at the front of a vehicle, such as at a front bumper or grill or fascia of the vehicle.

Figure 2:
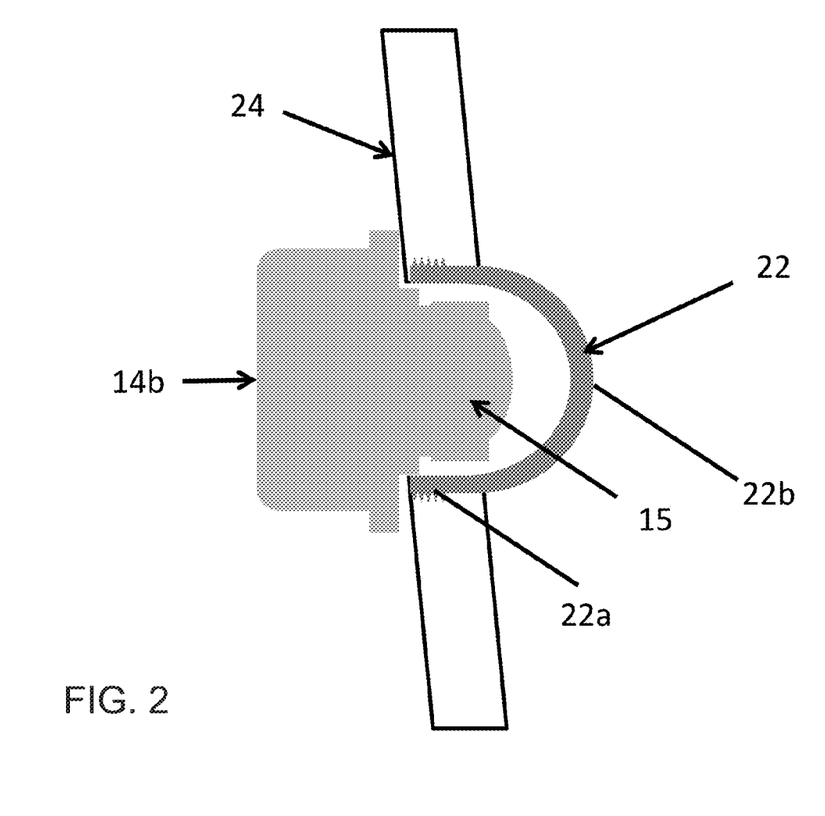
FIG. 2 is a sectional view of the camera and cover system of the present invention, shown with the removable cover attached at a vehicle structure at which the camera is disposed.

As shown in FIG. 2, the front camera 14b (and optionally the other cameras as well) includes or is associated with a removable transparent cover 22 that is removably or detachably disposed at the camera and in front of the lens 15. The low cost cover 22 may be provided with the initial vehicle vision system (such as sold with the vehicle) and a replacement cover can be purchased and replaced by the vehicle owner.

As shown in FIG. 2, the camera 14b is disposed at least partially behind a vehicle structure 24 and the lens 15 is disposed at (and may protrude partially through) an aperture of the vehicle structure 24. The cover 22 includes an attachment portion 22a that may attach (such as via a threaded attachment or snap-fit attachment or press-fit or interference-fit attachment or the like) at the vehicle structure, such as by threadedly attaching to the vehicle structure by external threads of the cover threading into internal threads at the aperture of the vehicle structure. The cover also includes a cover portion or curved cover 22b that is formed with the attachment portion and that, when the cover is attached at the vehicle and the camera is disposed at the vehicle, covers or overlays or protects the camera lens from exposure to the external environment as the vehicle is driven. If or when the cover is scratched or damaged, such as due to impact with debris as the vehicle is driven forwardly along a road, the vehicle owner can readily remove the damaged cover and replace it with a new cover, without having to remove or replace or adjust the camera itself.

Figure 3:
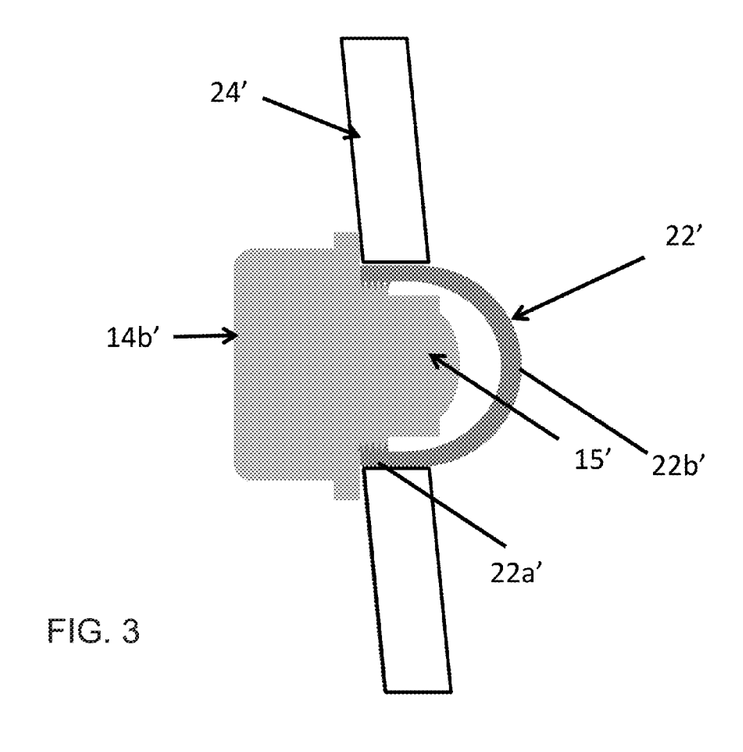
FIG. 3 is a sectional view of another camera and cover system of the present invention, shown with the removable cover attached at the camera.

Optionally, the cover may be attached to the camera, which is attached at a vehicle structure. For example, and such as shown in FIG. 3, the camera 14b' is disposed at least partially behind a vehicle structure 24' and the lens 15' is disposed at (and may protrude partially through) an aperture of the vehicle structure 24'. The cover 22' includes an attachment or mounting portion 22a' that may attach (such as via a threaded attachment or snap-fit attachment or press-fit or interference-fit attachment or the like) at the camera housing, such as by threadedly attaching to the camera housing by internal threads of the cover threading onto external threads at the camera housing. When the cover 22' is attached at the camera, the curved cover portion 22b' protects the camera lens from exposure to the external environment when the camera is disposed at the vehicle.

Figure 4:
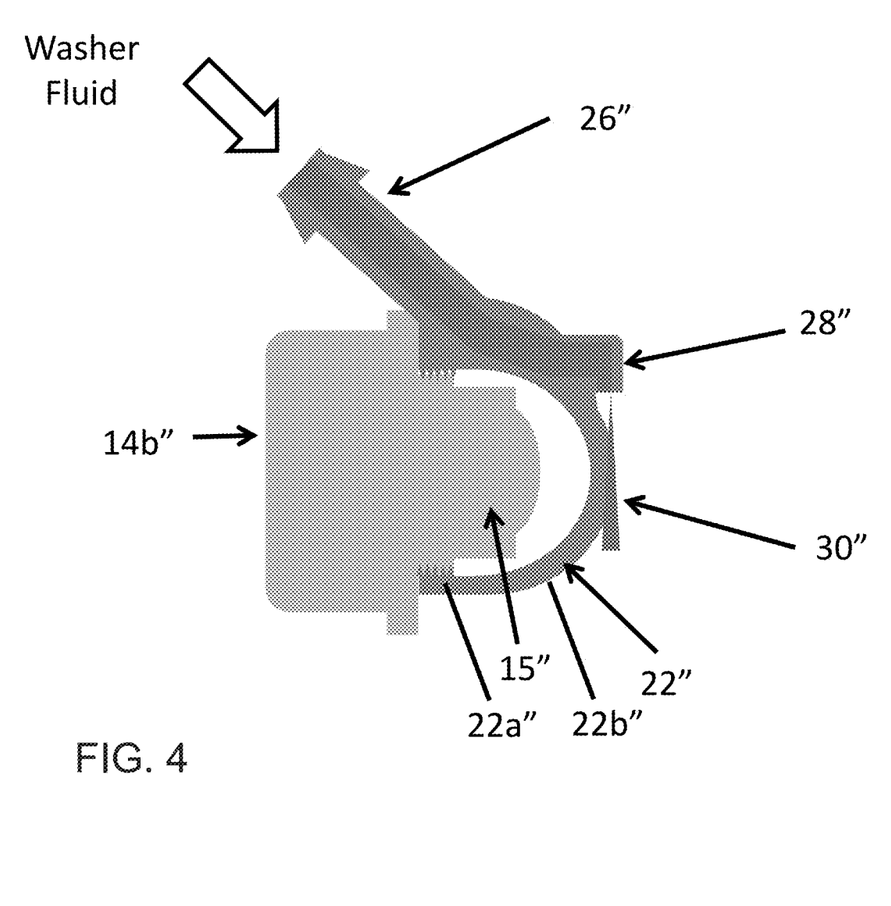
FIG. 4 is a sectional view of another camera and cover system of the present invention, shown with the removable cover attached at the camera and having a washer function to clean the cover.

Optionally, the cover may be associated with or connectable to a washer system for spraying washer fluid at the camera lens or cover. For example, and with reference to FIG. 4, the cover 22" includes or is associated with (or is integral with) a fluid passageway and connector 26" that may connect to a washer fluid tube of a washer system, which may be provided as a separate device which is mounted very near or even on the camera by the vehicle manufacturers. The connector then receives pressurized fluid from the washer system and the fluid passageway includes an opening or nozzle 28" that sprays the fluid 30" onto the exposed surface of the cover 22". In the illustrated embodiment of FIG. 4, the cover 22" includes an attachment portion 22a" that threadedly (or otherwise) attaches to the housing of the camera 14b" and includes a curved cover element 22b" to protect and cover the lens 15", but could otherwise attach to the camera housing or to the vehicle structure. The fluid washer feature may utilize aspects of the cameras and systems described in U.S. provisional applications, Ser. No. 62/189,963, filed Jul. 8, 2015, Ser. No. 62/158,838, filed May 8, 2015 and Ser. No. 62/134,062, filed Mar. 17, 2015, which are hereby incorporated herein by reference in their entireties.

Figure 5:
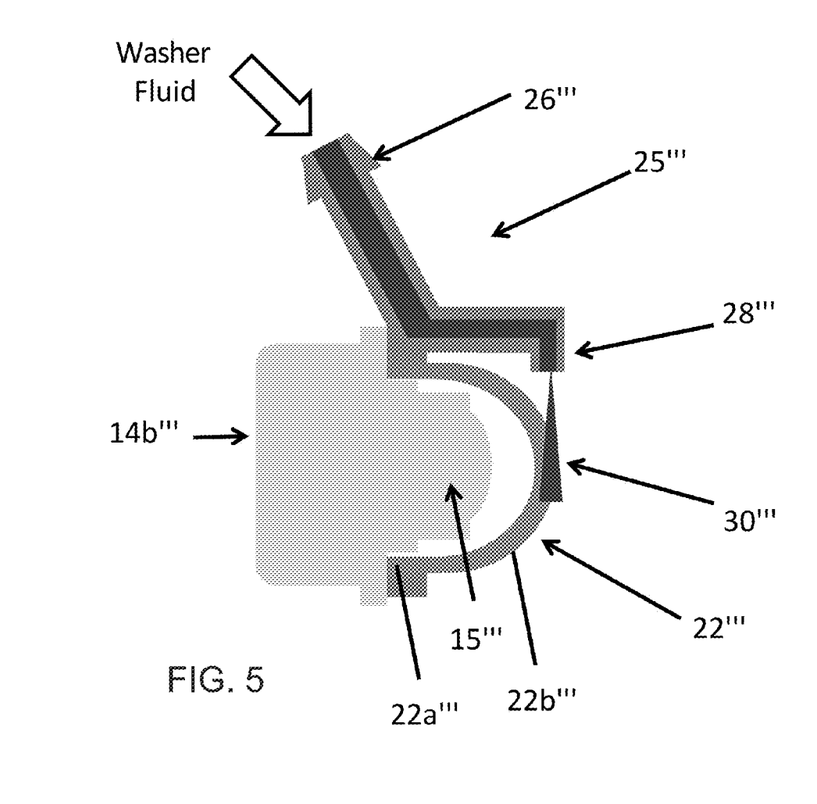
FIG. 5 is a sectional view of another camera and cover system of the present invention, shown with the removable cover attached at the camera and having a washer function detachably attachable at the removable cover.

Optionally, the cover may be configured to have a nozzle of a washer system (for spraying washer fluid at the camera lens or cover) attached thereat. For example, and with reference to FIG. 5, the cover 22''' includes an outer threaded attachment portion 22a''' that is configured to have a spray nozzle attachment 25''' (having a fluid passageway and connector 26''' that may connect to a washer fluid tube of a washer system and a nozzle or spray end 28'''), whereby, when the camera is mounted at a vehicle, the cover may attach to the camera (such as via a threaded attachment as shown or such as via a clip-attachment or snap-attachment or the like) and the spray nozzle attachment 25''' may optionally be threaded (or snapped or clipped) onto the cover 22''', and the connector 26''' may be connected to a fluid supply of the vehicle. The connector then receives pressurized fluid from the washer system and the fluid passageway includes an opening or nozzle 28''' that sprays the fluid 30''' onto the exposed surface of the curved cover portion 22b''' of cover 22'''. In the illustrated embodiment of FIG. 5, the cover 22''' threadedly attaches to the housing of the camera 14b''' to protect and cover the lens 15''', but could otherwise attach (such as snap-attach) to the camera housing or to the vehicle structure. The washer attachment 25''' thus may be provided as an optional attachment that can attach to the cover if desired or applicable. The washer attachment can also be removed from the cover for repair or replacement or the cover can be separately replaced (by removing the washer attachment from the cover and removing the cover from the camera or vehicle and then reattaching the original washer attachment to the new cover at the camera.

The cover is configured to cover and protect the camera lens and preferably provides for a very wide field of view of the camera (such as greater than about 180 degrees). The cover does not significantly alter incoming light or only alters such light in a very predictable manner that can be compensated for in the camera or image processing of image data captured by the camera. The cover comprises a very durable material and construction and withstands typical automotive exterior competent tests, such as gravel spray tests and the like. For example, the cover may comprise a durable transparent material such as a polycarbonate material with an acrylic hard coat. The cover may be formed by plastic injection molding to provide a unitarily formed cover.

Thus, the present invention provides a cover system or assembly that has a removable and replaceable cover element that is removably disposed at and in front of an exterior camera of a vehicle (such as at and in front of the lens of a forward viewing camera mounted at a front exterior portion of the vehicle). The cover may detachably attach at a vehicle structure at which the camera is mounted or disposed, or may detachably attach at the camera housing itself. Optionally, the cover system may be integrated with a washer system to provide or spray washing fluid at the cover element to clean the cover element. The washer system may be automatically operable to spray the cover element when image processing of captured image data determines that the cover element is dirty, or may be manually actuated when captured images displayed for viewing by the driver of the vehicle show dirt or debris at the cover element.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268 and/or 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308, 341; 7,289,037; 7,249,860; 7,004,593; 4,546,551; 5,699, 044; 4,953,305; 5,576,687; 5,632,092; 5,677,851; 5,708, 410; 5,737,226; 5,802,727; 5,878,370; 6,087,953; 6,173, 508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Pat. No. 9,264,672, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera configured to be disposed at an exterior portion of a vehicle so as to have a field of view exterior of the vehicle, said camera having a camera housing and a lens;
   wherein said camera is configured to fixedly mount at the exterior portion of the vehicle;
   wherein, with said camera mounted at the exterior portion of the vehicle, said lens is disposed at an aperture through the exterior portion of the vehicle;
   a cover element, wherein said cover element, with said camera disposed at the exterior portion of the vehicle, is detachably attached at said camera housing, wherein said cover element comprises a curved transparent portion and a mounting portion;
   wherein said mounting portion of said cover element is detachably attachable to said camera housing, and wherein, with said camera disposed at the exterior portion of the vehicle, and with said mounting portion of said cover element detachably attached at said camera housing, said cover element substantially covers or encompasses the aperture through the exterior portion of the vehicle;
   wherein said curved transparent portion of said cover element, with said camera disposed at the exterior portion of the vehicle and with said cover element detachably attached at said camera housing, (i) is disposed in front of said lens, so that light passing through said curved transparent portion is received by said lens, and (ii) protects said lens so that said lens is not exposed to the environment external the vehicle;
   wherein said cover element comprises a washer fluid dispensing portion, and wherein said washer fluid dispensing portion is configured to connect to a washer system of the vehicle, and wherein, with said camera disposed at the exterior portion of the vehicle and with said washer fluid dispensing portion connected to the washer system of the vehicle, the washer system and said washer fluid dispensing portion provide washer fluid to said cover element; and
   wherein, with said camera disposed at the exterior portion of the vehicle and with said mounting portion of said cover element detachably attached at said camera housing, said camera captures image data for a driving assistance system of the vehicle.

2. The vision system of claim 1, wherein said mounting portion includes internal threads that threadedly engage external threads at said camera housing to threadedly attach said cover element at said camera.

3. The vision system of claim 1, wherein said cover element comprises a transparent polycarbonate material.

4. A vision system for a vehicle, said vision system comprising:
   a camera configured to be disposed at an exterior portion of a vehicle so as to have a field of view exterior of the vehicle, said camera having a camera housing and a lens;
   wherein said camera is configured to fixedly mount at the exterior portion of the vehicle;
   wherein, with said camera mounted at the exterior portion of the vehicle, said lens is disposed at an aperture through the exterior portion of the vehicle;
   a cover element, wherein said cover element, with said camera disposed at the exterior portion of the vehicle, is detachably attached at said camera, wherein said cover element comprises a curved transparent portion and a mounting portion;
   wherein said mounting portion comprises internal attaching elements that engage external attaching elements at said camera housing to detachably attach said cover element at said camera housing;
   wherein, with said camera disposed at the exterior portion of the vehicle, and with said mounting portion of said cover element detachably attached at said camera housing, said cover element substantially covers or encompasses the aperture through the exterior portion of the vehicle;
   wherein said curved transparent portion of said cover element, with said camera disposed at the exterior portion of the vehicle and with said mounting portion detachably attached at said camera housing, (i) is disposed in front of said lens, so that light passing through said curved transparent portion is received by said lens, and (ii) protects said lens so that said lens is not exposed to the environment external the vehicle;

wherein said cover element comprises a washer fluid dispensing portion, and wherein said washer fluid dispensing portion is configured to connect to a washer system of the vehicle, and wherein, with said camera disposed at the exterior portion of the vehicle and with said washer fluid dispensing portion connected to the washer system of the vehicle, the washer system and said washer fluid dispensing portion provide washer fluid to said cover element; and wherein, with said camera disposed at the exterior portion of the vehicle, and with said mounting portion of said cover element detachably attached at said camera housing, said camera captures image data for a driving assistance system of the vehicle.

5. The vision system of claim 4, wherein said internal attaching elements comprise internal threads that threadedly engage threads of said external attaching elements of said camera housing.

6. The vision system of claim 4, wherein said cover element comprises a transparent polycarbonate material.

7. A vision system for a vehicle, said vision system comprising:

a camera configured to be disposed at an exterior portion of a vehicle so as to have a field of view exterior of the vehicle, said camera having a camera housing and a lens;

wherein said camera is configured to fixedly mount at the exterior portion of the vehicle;

wherein, with said camera mounted at the exterior portion of the vehicle, said lens is disposed at an aperture through the exterior portion of the vehicle;

a cover element, wherein said cover element, with said camera disposed at the exterior portion of the vehicle, is detachably attached at said camera, and wherein said cover element comprises a curved transparent portion and a mounting portion, and wherein said mounting portion comprises a threaded mounting portion for detachably attaching said cover element at said camera housing;

wherein, with said camera disposed at the exterior portion of the vehicle, and with said mounting portion of said cover element detachably attached at said camera housing, said cover element substantially covers or encompasses the aperture through the exterior portion of the vehicle;

wherein said curved transparent portion, with said camera disposed at the exterior portion of the vehicle, and with said mounting portion of said cover element detachably attached at said camera housing, (i) is disposed in front of said lens, so that light passing through said curved transparent portion is received by said lens, and (ii) protects said lens so that said lens is not exposed to the environment external the vehicle;

wherein said cover element comprises a washer fluid dispensing portion and wherein, with said cover element disposed at said camera disposed at the exterior portion of the vehicle, said washer fluid dispensing portion connects to a washer system of the vehicle to provide washer fluid to said cover element; and wherein, with said camera disposed at the exterior portion of the vehicle and with said mounting portion of said cover element detachably attached at said camera housing, said camera captures image data for a driving assistance system of the vehicle.

8. The vision system of claim 7, wherein said threaded mounting portion of said cover element is configured to threadedly attach said cover element at a threaded portion of said camera housing.

9. The vision system of claim 7, wherein said cover element comprises a transparent polycarbonate material.

\* \* \* \* \*